(12) United States Patent
Bautz et al.

(10) Patent No.: US 10,617,981 B2
(45) Date of Patent: Apr. 14, 2020

(54) FILTER DEVICE FOR FLUIDS

(71) Applicant: RT-FILTERTECHNIK GMBH, Friedrichshafen (DE)

(72) Inventors: Marco Bautz, Friedrichshafen (DE); Gerhard Stehle, Constance (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 657 days.

(21) Appl. No.: 14/912,178

(22) PCT Filed: Jul. 5, 2014

(86) PCT No.: PCT/EP2014/001852
§ 371 (c)(1),
(2) Date: Feb. 16, 2016

(87) PCT Pub. No.: WO2015/014432
PCT Pub. Date: Feb. 5, 2015

(65) Prior Publication Data
US 2016/0184746 A1    Jun. 30, 2016

(30) Foreign Application Priority Data
Aug. 30, 2013 (DE) ........................ 10 2013 014 453

(51) Int. Cl.
*B01D 29/90* (2006.01)
*B01D 35/027* (2006.01)
(Continued)

(52) U.S. Cl.
CPC .......... *B01D 29/908* (2013.01); *B01D 29/23* (2013.01); *B01D 35/027* (2013.01); *B01D 35/06* (2013.01)

(58) Field of Classification Search
None
See application file for complete search history.

(56) References Cited

U.S. PATENT DOCUMENTS

| 1,948,419 | A | * | 2/1934 | Granigg | .................... | B03C 1/14 |
| | | | | | | 209/221 |
| 2,317,774 | A | * | 4/1943 | Aninga | .................. | B01D 35/06 |
| | | | | | | 209/232 |

(Continued)

FOREIGN PATENT DOCUMENTS

| DE | 11 66 555 | 3/1964 |
| DE | 10 2004 014 149 | 1/1997 |

(Continued)

OTHER PUBLICATIONS

International Search Report (ISR) dated Oct. 9, 2014 in International (PCT) Application No. PCT/EP2014/001852.

*Primary Examiner* — Jonathan M Peo
(74) *Attorney, Agent, or Firm* — Wenderoth, Lind & Ponack, L.L.P.

(57) ABSTRACT

A filter device for fluids, in particular in the form of a tank-installation return filter, includes a filter element (27) accommodated in a housing (3) having a fluid inlet (17) for supplying unfiltered fluid to an inner cavity (31) of the filter element (27). The inner cavity is surrounded by a filter medium (29) through which unfiltered fluid can flow. A flow-conducting apparatus (13, 49, 77) orients the flow of the unfiltered fluid reaching the filter medium (29) and is provided between the fluid inlet (17) and the inner cavity (31) of the filter element (27).

18 Claims, 5 Drawing Sheets

(51) Int. Cl.
*B01D 35/06* (2006.01)
*B01D 29/23* (2006.01)

(56) References Cited

U.S. PATENT DOCUMENTS

| | | | |
|---|---|---|---|
| 3,353,678 A | | 11/1967 | Dragon |
| 4,107,048 A | * | 8/1978 | Darash ................. B01D 35/147 |
| | | | 210/407 |
| 4,450,075 A | * | 5/1984 | Krow ..................... B01D 35/06 |
| | | | 210/223 |
| 4,657,671 A | * | 4/1987 | Botstiber ............. B01D 29/117 |
| | | | 210/111 |
| 5,002,890 A | * | 3/1991 | Morrison ............... C12M 23/06 |
| | | | 210/396 |
| 6,423,225 B2 | | 7/2002 | Wong et al. |
| 6,464,863 B1 | * | 10/2002 | Nguyen ............... B01D 35/027 |
| | | | 210/167.03 |
| 2011/0056875 A1 | * | 3/2011 | Stehle ................. B01D 29/605 |
| | | | 210/172.1 |

FOREIGN PATENT DOCUMENTS

| | | |
|---|---|---|
| DE | 10 2007 014 813 | 10/2008 |
| GB | 562175 | 6/1944 |

* cited by examiner

FILTER DEVICE FOR FLUIDS

FIELD OF THE INVENTION

The invention relates to a filter device for fluids, in particular in the form of a tank-installation return filter. The filter device has at least one filter element accommodated in a housing. The housing has a fluid inlet for supplying unfiltered fluid to an inner cavity of the respective filter element. The inner cavity is surrounded by a filter medium through which unfiltered fluid can flow.

BACKGROUND OF THE INVENTION

Such filter devices are available on the market in many prior art designs and embodiments. Among other things, they are used to filter out impurities in fluids, such as hydraulic fluid. Hydraulic fluid becomes contaminated with impurities during the installation and start-up of the respective hydraulic system. In addition to this initial contamination, contamination can also occur during operation, for example by impurities infiltrating the hydraulic tank due to inadequate tank ventilation, pipe openings, piston rod seals, and the like. In particular in hydraulic systems of work machines, such as earth movers, excavators, and the like, filtering returning fluids immediately in the area of the hydraulic tank, for example by installing the filter device directly in the tank as a return filter, can be useful. Document DE 10 2004 014 149 B4 discloses an example of a tank-installation filter.

SUMMARY OF THE INVENTION

On the basis of this prior art, the problem addressed by the invention is that of providing a filter device of the aforementioned type, which is distinguished by particularly favorable operating performance.

According to the invention, this problem is basically solved by a filter device having, as an essential special feature of the invention, a flow-conducting apparatus. The flow-conducting apparatus orients the flow of the unfiltered fluid reaching the filter medium and is provided between the fluid inlet via which the unfiltered fluid flows into the filter device and the inner cavity of the filter element. A more uniform pressure and flow distribution inside the filter element is achievable by influencing the flow direction in a targeted manner. A maximum retention time of the fluid inside the cavity of the filter element and along any additional elements that may be situated in the filter cavity, for example along a magnetic core or sensors can be achieved. The filter folds in a folded filter medium are virtually stressed on one side only when the fluid is oriented in this manner, which can improve the performance of the filter element.

In exemplary embodiments in which the filter medium of the respective filter element delimits a cylindrical cavity, the flow-conducting apparatus has, in a particularly advantageous fashion, a guide for generating a swirl flow, which rotates in the cavity about the cylinder axis. A particularly long retention time along magnetic cores, and thus, an efficient separation of ferromagnetic particles from the fluid is then achievable.

In particularly advantageous exemplary embodiments, the flow conducting apparatus has an inflow chamber upstream of the swirl-generating guide. The unfiltered fluid enters the inflow chamber with an inflow direction predetermined by a connector apparatus. From the inflow chamber, the unfiltered fluid reaches the swirl-generating guide with a flow direction that is altered relative to the inflow direction. The deflection of the inflowing fluid stream taking place in the inflow chamber leads to a flow abatement before the unfiltered fluid reaches the swirl-generating guide.

In particularly advantageous fashion, the swirl-generating guide can have one functional level in the form of a guide body situated in the inflow chamber that forms the flow path from the inflow chamber to an opening of the associated end cap of the filter element in question. Into the guide body, the unfiltered fluid can flow from the inflow chamber via an opening facing away from the connector apparatus and having inner conducting surfaces that extend in a spiral around the axis to generate a swirl. A swirl flow rotating about the axis is then generated within the area of the inflow chamber and before the fluid reaches the filter cavity of the filter element via the end cap thereof.

In order to achieve a particularly effective rotation, in a particularly advantageous fashion, the swirl-generating guide can have another functional level in the form of guide vane-shaped swirl elements situated at the opening of the end cap leading to the filter cavity. The rotation of the flow is then further strengthened directly at the element inlet.

In the use as a tank installation filter, the inflow chamber can advantageously be disposed on the top of a fluid tank forming the downstream (clean) side in the filtering process, and can have a floor formed by a tank wall section. In that tank wall section, an installation opening for the filter housing projecting into the tank is present, as well as a detachable housing lid facing the installation opening. The housing lid then not only closes the inflow chamber, but also serves as a maintenance and service opening for the installation and removal of the filter element when changing the latter.

The guide body having the spiral conducting surfaces, which form the first functional level of the swirl-generating guide, can extend in an advantageous fashion from the bottom of the housing lid until it contacts the end cap of the filter element in the operational position. The guide body then not only forms the fluid guide, but can also serve as a retaining element that holds the filter element in the operational position in the filter housing.

In an advantageous fashion, the guide body can be attached to the housing lid and have a coaxial passage through which a magnetic core carrier fixed on the housing lid extends into the inner cavity of the filter element in question. By removing the lid along with the attached guide body when changing the element, not only does the filter element become freely accessible, but the magnetic core and any sensors disposed thereon will be taken out as well, thus making these components available for evaluation.

In an advantageous fashion, the filter housing can be fixed by a fastening flange to the installation opening formed in the floor of the inflow chamber, thus forming a seal that separates the upstream inflow chamber from the downstream tank. The filter housing can then have a wall section extending from its fastening flange through the inflow chamber to the housing lid, which wall section forms an impact wall that is arranged facing the connector apparatus for the unfiltered fluid situated on the chamber wall. The impact wall formed by the wall section of the filter housing projecting into the inflow chamber then forms a flow deflection apparatus or flow deflector provided in the inflow chamber for flow abatement.

The subject matter of the invention is also a filter element that is provided for use with a filter device according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
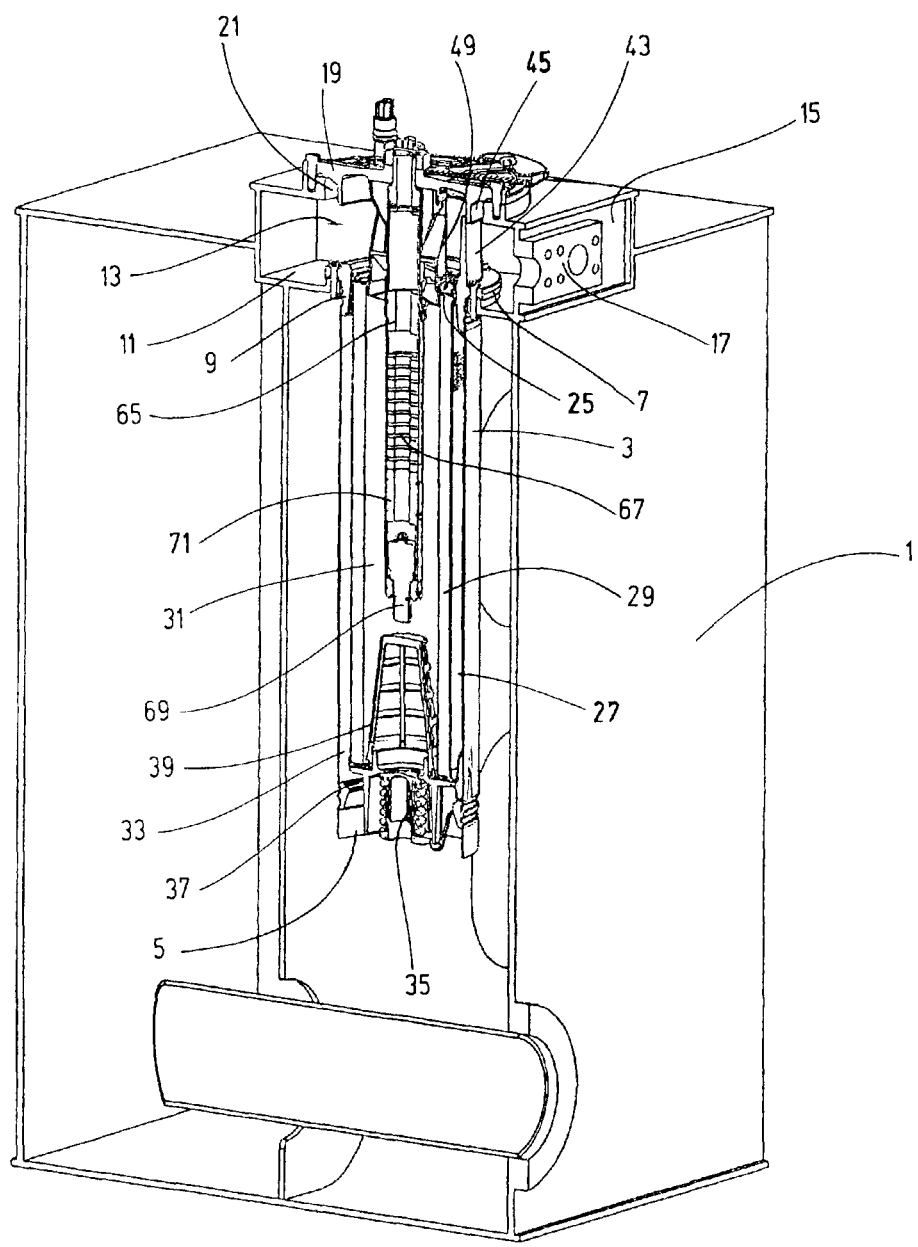
FIG. 1 is a perspective view in section of a filter device according to an exemplary embodiment of the invention, installed in a fluid tank.
Figure 2:
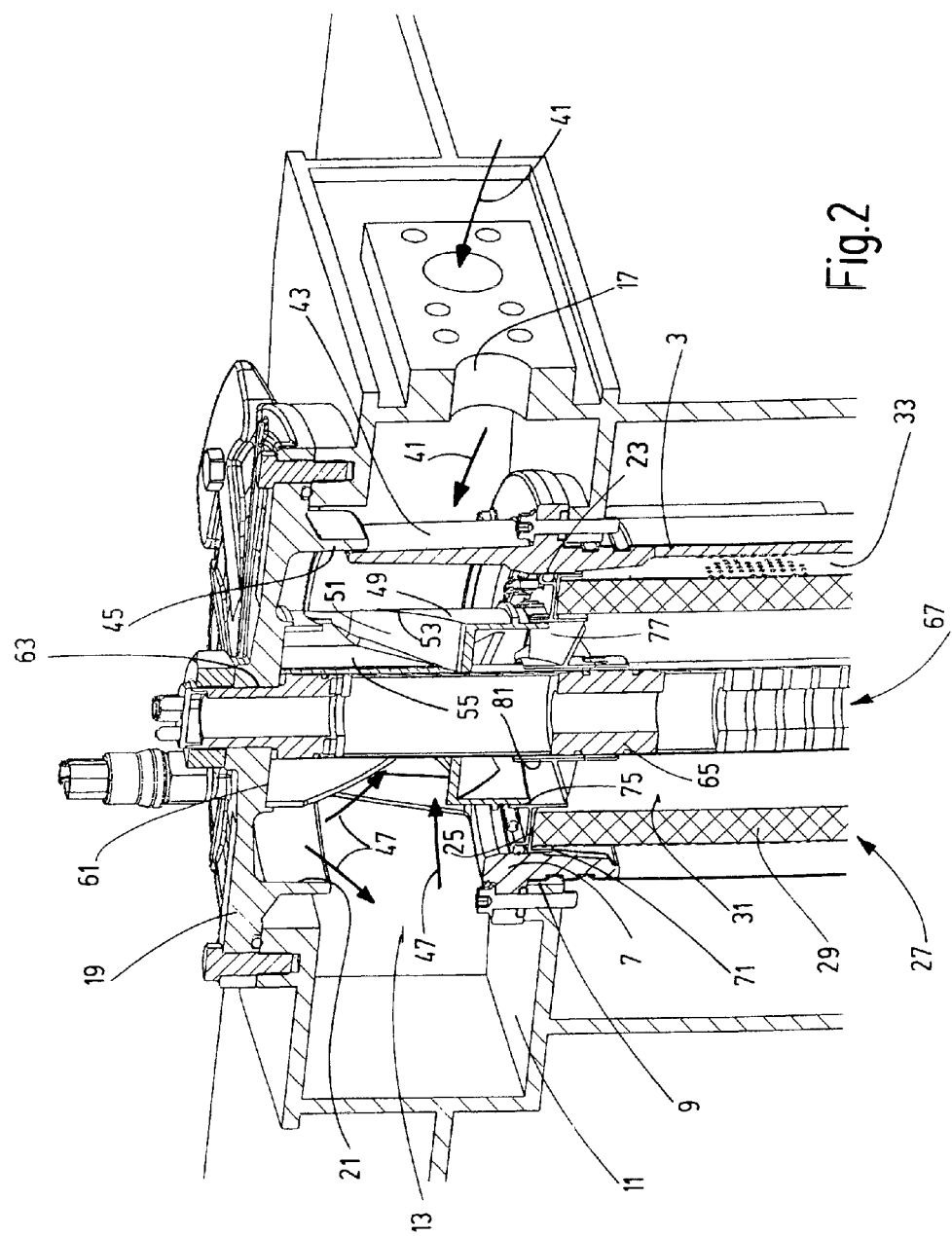
FIG. 2 is a partial, perspective view in section of the top portion of FIG. 1 illustrated in larger scale.
Figure 3:
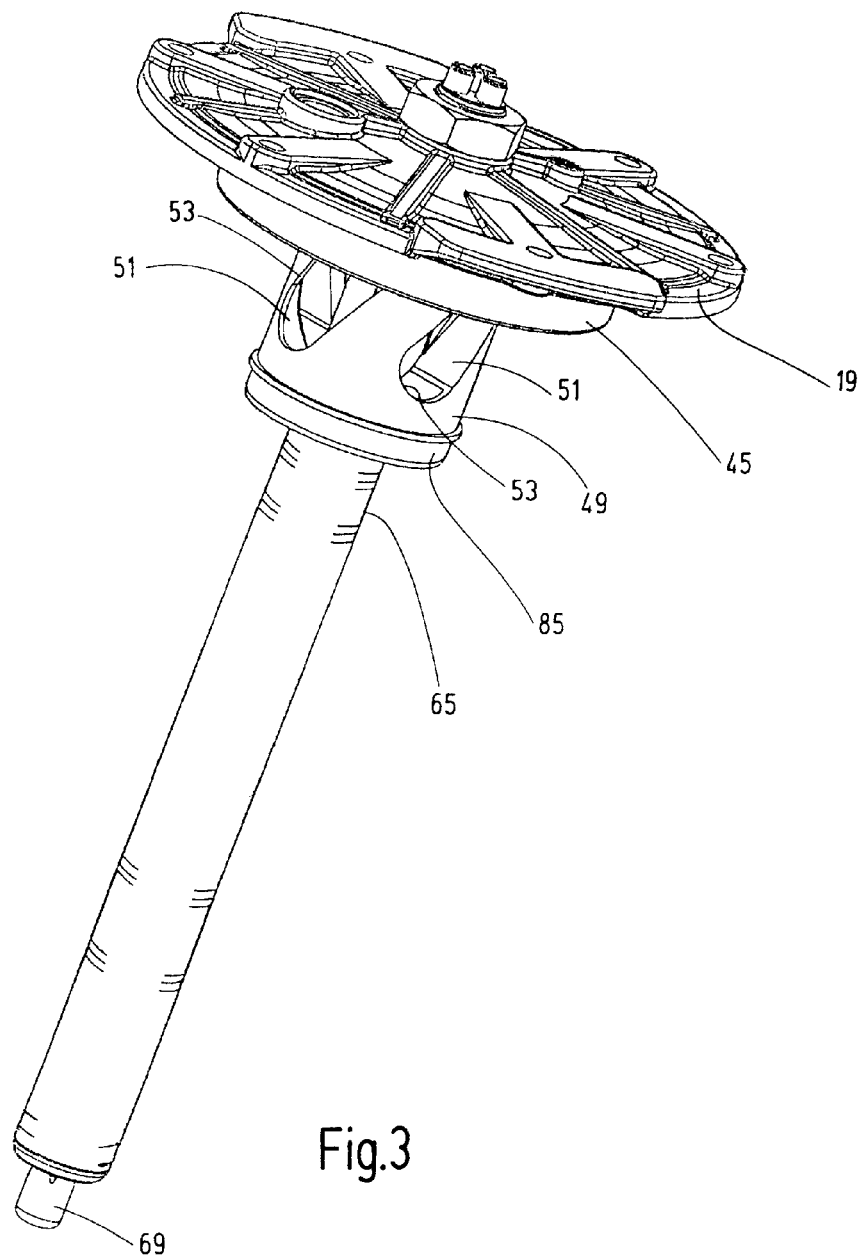
FIG. 3 is a perspective view of the housing lid with a guide body of the flow-conducting apparatus and a magnetic core situated thereon of the filter device of FIG. 1.

FIG. 1 shows a tank 1 storing a fluid, such as hydraulic fluid, with an exemplary embodiment of the filter device according to the invention in the form of a tank-installation return filter installed therein. The filter device has a hollow cylinder-type filter housing 3, the bottom end 5 of which is open to the tank contents. This open bottom end 5 forms the outlet on the downstream (clean) side, through which the cleaned fluid exits the filter housing 3 and reaches the tank contents. On its top end, the filter housing 3 has a fastening flange 7 fastened onto an installation opening 9 by screwing. The installation opening 9 is situated in an upper tank wall section in the form of a level floor 11 of an inflow chamber 13, which is disposed slightly recessed in the top of the tank 1. The inflow chamber 13 has the shape of a rectangular box. On a narrow side 15 of the box there is a connector apparatus or connector 17 via which unfiltered fluid can flow into the chamber 13, with an inflow direction extending parallel to the floor 11 and to the long sides of the chamber 13. To this end, provision is made in the connector apparatus 17 for a plurality of inflow channels extending parallel to one another. The foremost channel opening in the viewing direction of FIG. 1 is shown in section. On the top, the inflow chamber 13 can be closed with a detachable housing lid 19, which is coaxial to the longitudinal axis of the filter housing 3 and which closes a housing opening 21 greater in diameter than the installation opening 9 in the floor 11.

The fastening flange 7 of the filter housing 3 forms a seating surface 23 on its inside for the sealed contact of the associated end cap 25 of a filter element 27. The end cap 25 in typical fashion forms a rim for the facing axial end of a hollow cylinder-shaped filter medium 29, which surrounds an inner filter cavity 31 that forms the upstream side of the filtering process. Accordingly, the space 33 between the outer side of the filter medium 29 and the inner wall of the filter housing 3 forms the downstream side, from which the filtered fluid exits the filter housing 3 via the open bottom end 5 and reaches the tank contents. Likewise in typical fashion, the upstream cavity 31 of the filter element 27 is safeguarded against excessive pressure build-up by a bypass valve 35 (FIG. 1), which is situated on the bottom end cap 37 of the filter element 27. A debris catching basket 39 projecting into the filter cavity 31 is provided at this opening.

Figure 4:
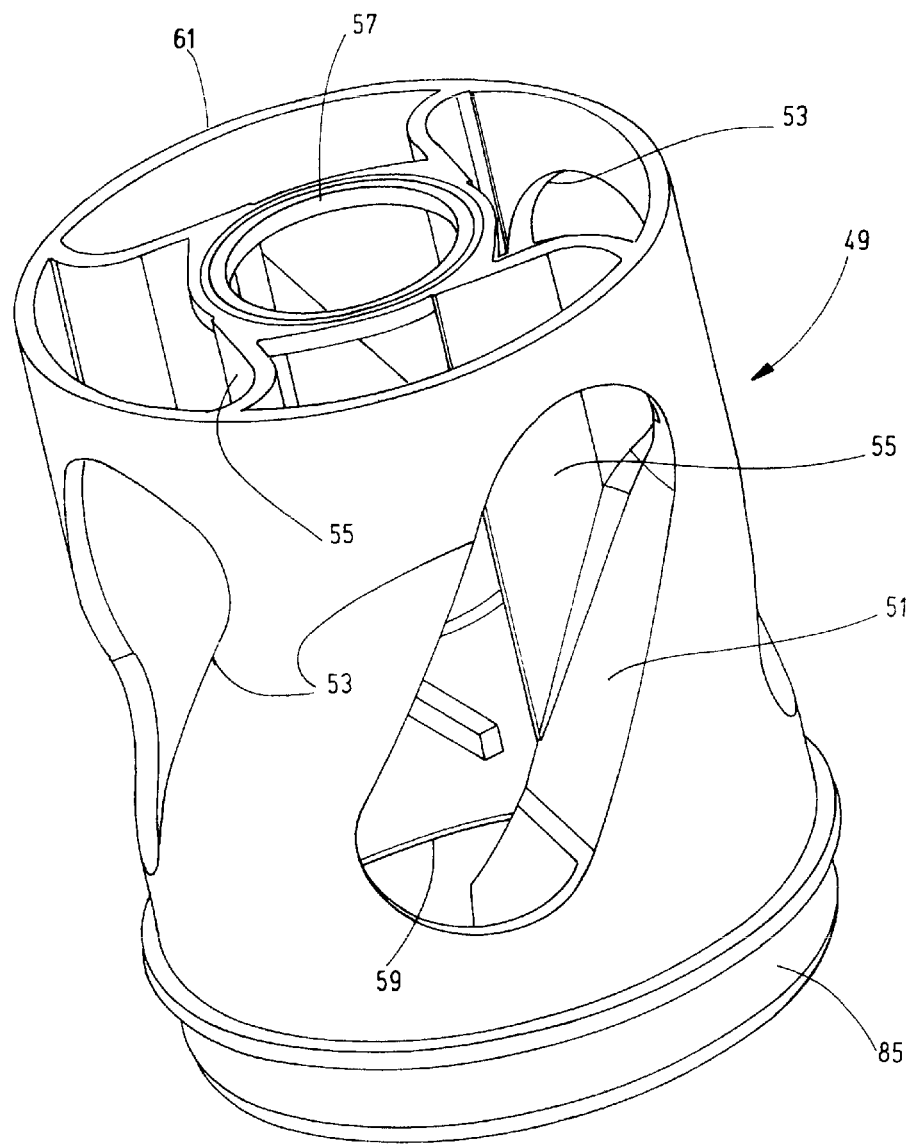
FIG. 4 is a perspective view of the guide body of the filter device of FIG. 1 drawn on a larger scale relative to FIGS. 2 and 3.

As an essential component of the flow-conducting apparatus or flow conductor provided according to the invention, the inflow chamber 13 forms a space that abates and orients the flow of unfiltered fluid incoming via the connector apparatus 17. The inflow direction of is indicated with flow arrows 41. For this purpose, the inflow chamber 13 has a conducting element in the form of a wall section 43, which extends in the form of a circular section from the fastening flange 7 of the filter housing 3 through the inflow chamber 13 to an annular body 45 situated on the inside of the housing lid 19. The wall section 43 forms an impact wall and extends over an arc length such that the fluid can flow around it laterally, along the long sides of the inflow chamber 13. The flow path of the unfiltered fluid then continues with an altered flow direction indicated by arrows 47 on the way toward the inner cavity 31 of the filter element 27. The filter device of the invention has swirl-generating guide in two functional levels on this other fluid path. The first functional level is formed by a guide body 49, which is shown separately in FIG. 4. As can be clearly discerned from FIG. 4, the guide body 49 has conducting surfaces 51 inside a hollow cylinder. The conducting surfaces 51 have a spiral course relative to the longitudinal axis such that a swirl is generated in an axial flow in such a way that the flow rotates about the longitudinal axis. Entry windows 53 extend obliquely to the axis and are formed in the wall of the guide body 49 for admitting the fluid to the conducting surfaces 51. The conducting surfaces 51 are delimited in a radially inward manner by axially extending wall portions 55, which abut at the top and bottom ends against inner rings 57 and 59, respectively, and which delimit a central passage through the guide body 49. The guide body 49 is attached to the bottom of the housing lid 19 with the edge 61 (the edge on the top in the figures). Furthermore, an end of the carrier 65 of a magnetic core is mounted in a central through-bore 63 of the housing lid 19. The carrier has, in a fashion typical of magnetic cores, a group of permanent magnets 67 and, with the housing lid 19 attached, extends into the filter cavity 31 as far as the debris-catching basket 39. The carrier 65 thus passes through the inner passage of the guide body 49 and the opening 75 of the end cap 25. A sensor 69 on the bottom end of the magnetic core enables a monitoring of the quality of the hydraulic fluid. The amount of ferritic particles collected by the magnets 67 can be indicated by a sensor 71. Furthermore, on the inside of the end cap 37 provision can be made for a RFID sensor 73 for detecting the filter element 27.

Figure 5:
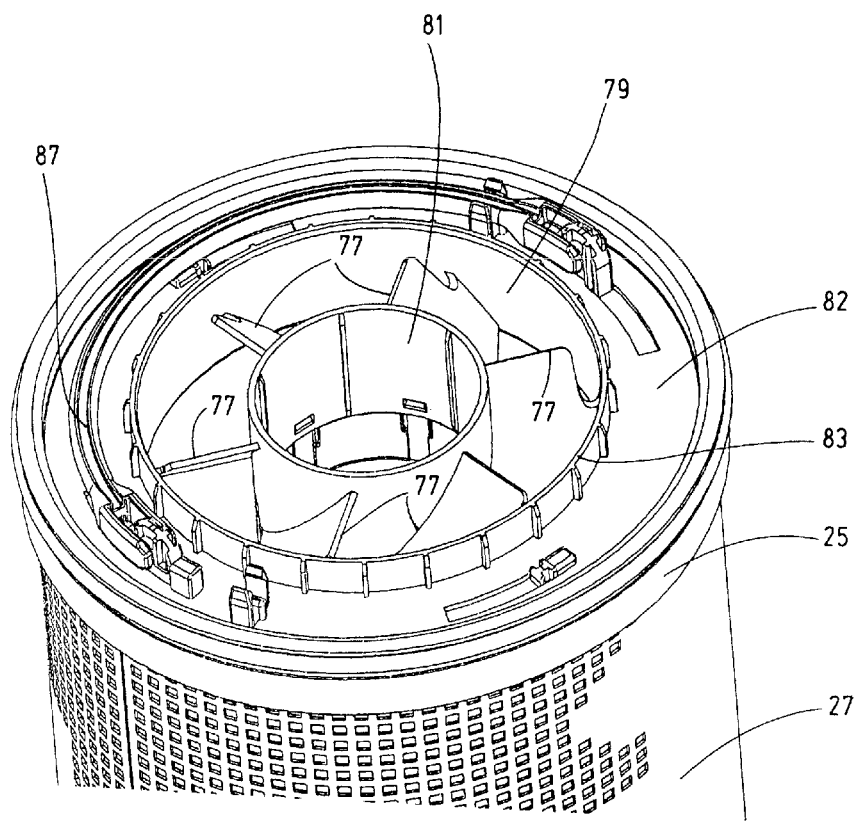
FIG. 5 is a partial perspective view of an end cap as well as components allocated to that end cap of a filter element provided for use in the filter device of FIG. 1.

As a second level of the swirl-generating guide, at the opening 75 of the end cap 25 leading to the filter cavity 31 provision is made of another or second swirl-generating apparatus or guide. The second guide has guide vanes 77 arranged in a ring channel in the nature of turbine blades. The channel 79 is delimited on the inside by a connection piece 81 of the end cap 25. The carrier 65 of the magnetic core passes through the connection piece 8, in the operational position. A connection plate 82 (FIG. 5) surrounding the channel 79 is situated on the top of the end cap 25, which plate has a projecting ring 83 surrounding the channel 79. In the operational position, the end section 85 of the guide body 49 contacts the inside of the projecting ring 83 such that the flow path continues from the guide body 49 to the filter cavity 31 via the channel 79 with the guide vanes 77. The swirl imparted to the flow by the spiral conducting surfaces 51 of the guide body 49 is further strengthened at the inlet of the filter cavity 31 by the guide vanes 77 such that a powerful rotation about the longitudinal axis takes place inside the filter cavity 31. For this purpose there are, in particular, more guide vanes (6) on the end cap 25 of the filter element than there are (4) on the guide body 49. By suitably positioning and selecting the curvature for each stationary disposed guide vane, the swirl flow can be adjusted for the fluid in an evident manner. As FIG. 5 shows, a retaining bracket 87 that forms a handle for changing the filter element is mounted in a hinged manner on the top of the end cap 25.

While one embodiment has been chosen to illustrate the invention, it will be understood by those skilled in the art that various changes and modifications can be made therein without departing from the scope of the invention as defined in the claims.

The invention claimed is:

1. A filter device for fluids, comprising:
a fluid inlet for supplying unfiltered fluid to be filtered;
a filter housing;
a filter element being in said filter housing and having an inner cavity in fluid communication with said fluid inlet to receive the unfiltered fluid, said inner cavity being surrounded by a filter medium through which the unfiltered fluid can flow and be filtered and being in fluid communication with said fluid inlet without passing through said filter medium, said filter medium having an end cap on an axial end thereof with an opening in said end cap; and
a flow conductor being capable of orienting flow of the unfiltered fluid and being provided in fluid communication between said fluid inlet and said inner cavity of said filter element, said flow conductor including a swirl-generating guide having a first functional level at a tubular guide body located in an inflow chamber located downstream of said fluid inlet, said guide body being in a flow path of the unfiltered fluid from said inflow chamber to said opening in said end cap, said guide body having inner conducting surfaces extending along a spiral path axially along and rotationally about a longitudinal axis of said guide body capable of generating a swirl flow in a flow of the unfiltered fluid into said inner cavity and having entry windows formed in a wall of said guide body in fluid communication with and downstream of said fluid inlet to convey the unfiltered fluid to said inner conducting surfaces.

2. A filter device according to claim 1 wherein
said filter medium delimits a cylindrical shape for said inner cavity having a cylinder axis coaxial to said longitudinal axis.

3. A filter device according to claim 1 wherein
said fluid inlet comprises an inlet connector causing the unfiltered fluid to enter said inflow chamber in an inflow direction, a flow direction of the unfiltered fluid being altered from the inflow direction by said guide body relative to the inflow direction into said inner cavity.

4. A filter device according to claim 1 wherein
said swirl-generating guide having a second functional level including guide vane-shaped elements situated at said opening in said end cap leading to said inner cavity.

5. A filter device according to claim 1 wherein
said inflow chamber is disposed on a top of a fluid tank downstream of said filter element and comprises a floor formed by a tank wall section, said tank wall section having an installation opening receiving said filter housing, said filter housing projecting into said fluid tank; and
a detachable tank housing lid faces said installation opening.

6. A filter device according to claim 5 wherein
said guide body extends from a bottom of said tank housing lid and contacts said end cap of said filter element in an operational position thereof.

7. A filter device according to claim 6 wherein
said guide body is attached to said tank housing lid and comprises a coaxial passage receiving a magnetic core carrier, said magnetic core carrier being fixed to said tank housing lid and extending into said inner cavity of said filter element.

8. A filter device according to claim 5 wherein
said filter housing is attached in said installation opening by a fastening flange engaging said floor of said inflow chamber adjacent said installation opening and forming a seal separating said inflow chamber from said fluid tank.

9. A filter device according to claim 8 wherein
said filter housing comprises a wall section extending from said fastening flange, through said inflow chamber to said tank housing lid, said wall section of said filter housing forming an impact wall arranged opposite and facing said fluid inlet, said fluid inlet being in a chamber wall of said inflow chamber.

10. A filter device according to claim 1 wherein
said wall of said guide body is parallel to said longitudinal axis.

11. A filter device according to claim 1 wherein
said entry windows extend obliquely to said longitudinal axis.

12. A filter device according to claim 4 wherein
said inner conducting surfaces and said guide vane-shaped elements are axially spaced along said longitudinal axis.

13. A filter device according to claim 1 wherein
said wall of said guide body extends coaxially to said longitudinal axis with said entry window extending through said wall of said guide body transverse to said longitudinal axis.

14. A filter device for fluids, comprising:
a fluid inlet for supplying unfiltered fluid to be filtered;
a filter housing;
a filter element being in said filter housing and having an inner cavity in fluid communication with said fluid inlet to receive the unfiltered fluid, said inner cavity being surrounded by a filter medium through which the unfiltered fluid can flow and be filtered, said filter medium having an end cap on an axial end thereof with an opening in said end cap; and
a flow conductor being capable of orienting flow of the unfiltered fluid and being provided in fluid communication between said fluid inlet and said inner cavity of said filter element, said flow conductor including a swirl-generating guide having a first functional level at a guide body located in an inflow chamber located downstream of said fluid inlet, said guide body being in a flow path of the unfiltered fluid from said inflow chamber to said opening in said end cap, said guide body having inner conducting surfaces extending along a spiral path axially along and rotationally about a longitudinal axis of said guide body capable of generating a swirl flow in a flow of the unfiltered fluid into said inner cavity and having entry windows formed in a wall of said guide body in fluid communication with and downstream of said fluid inlet to convey the unfiltered fluid to said inner conducting surfaces, said inflow chamber being disposed on a top of a fluid tank downstream of said filter element and comprises a floor formed by a tank wall section, said tank wall section having an installation opening receiving said filter housing, said filter housing projecting into said fluid tank; and a detachable tank housing lid facing said installation opening.

15. A filter device according to claim 14 wherein
said guide body extends from a bottom of said tank housing lid and contacts said end cap of said filter element in an operational position thereof.

16. A filter device according to claim 15 wherein
said guide body is attached to said tank housing lid and comprises a coaxial passage receiving a magnetic core carrier, said magnetic core carrier being fixed to said tank housing lid and extending into said inner cavity of said filter element.

17. A filter device according to claim 14 wherein
said filter housing is attached in said installation opening by a fastening flange engaging said floor of said inflow chamber adjacent said installation opening and forming a seal separating said inflow chamber from said fluid tank.

18. A filter device according to claim 17 wherein
said filter housing comprises a wall section extending from said fastening flange, through said inflow chamber to said tank housing lid, said wall section of said filter housing forming an impact wall arranged opposite and facing said fluid inlet, said fluid inlet being in a chamber wall of said inflow chamber.

* * * * *